UNITED STATES PATENT OFFICE.

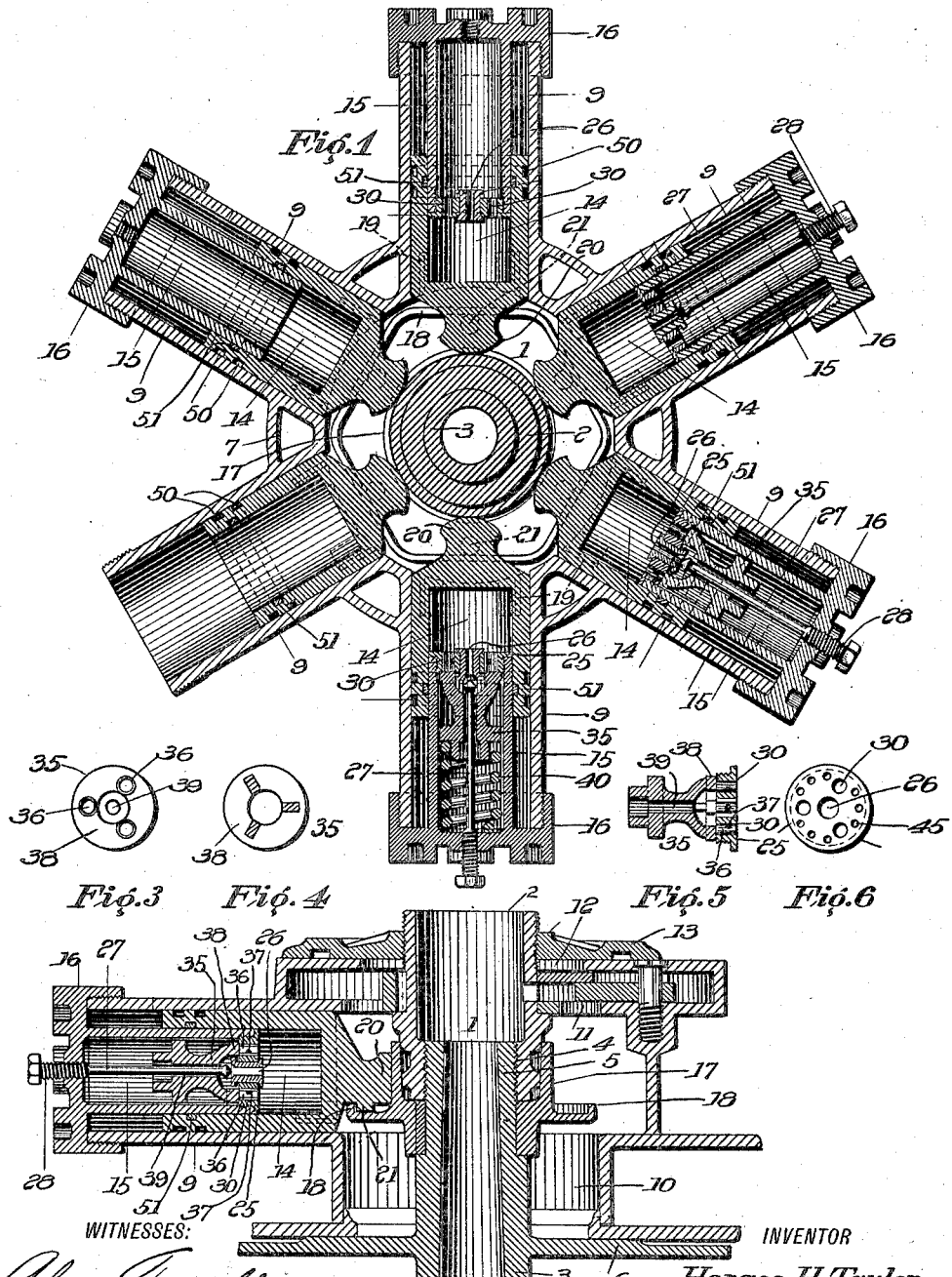

HORACE HOUGHTON TAYLOR, OF OAKLAND, CALIFORNIA, ASSIGNOR OF ONE-THIRD TO FRANK J. MAYHEW, OF SAN FRANCISCO, CALIFORNIA.

HYDRAULIC VEHICLE-WHEEL.

1,275,790.        Specification of Letters Patent.     Patented Aug. 13, 1918.

Application filed December 19, 1916. Serial No. 137,917.

*To all whom it may concern:*

Be it known that I, HORACE HOUGHTON TAYLOR, citizen of the United States, residing at Oakland, in the county of Alameda and State of California, have invented certain new and useful Improvements in Hydraulic Vehicle-Wheels, of which the following is a specification.

My invention is a hydraulic resilient vehicle wheel and consists in certain novel features and combination of elements which will be hereinafter particularly described and pointed out in the claims.

Referring to the drawings, which form part of this specification and the appended claims:

Figure 1 shows a sectional view of the part of the wheel in which shocks and jars incident to travel are absorbed.

Fig. 2 shows a sectional view of one of the shock absorbing cylinders and parts of the hub.

Fig. 3 shows a bottom view of a valve seat.

Fig. 4 shows a top view of the same.

Fig. 5 shows a sectional view of my improved valve.

Fig. 6 shows a bottom view of the same.

Numeral 1 indicates the hub of the wheel which is composed of two members 2 and 3, the member 2 of which is provided with a threaded opening 4 into which a threaded end 5 of member 3 screws whereby said members are held securely together. A flange 6 extends from the rear end of the hub member 3 at right angles to the hub axis against which flange the rear face of a wheel sustaining frame 7 rests and is adapted to slide with relation thereto.

A plurality of cylinders 9, which may be six in number, are formed on the frame 7, the axis of which extend radially to the center of the frame, which center, in the ideal relation of the frame and hub, corresponds to the center of the hub. The frame is provided with openings 10, 11 and 12 through which the hub extends, which openings are of sufficient size to permit the proper relative movement of the hub and frame.

The front end of the hub member 2 is threaded, and a disk nut 13 screws on said threaded part to such position as to engage the front face of the frame 7 to hold said frame between said nut and the flange 6, in its proper sliding relation to said nut and flange. Cylinders 14 are reciprocatively mounted within the inner portion of the cylinders 9, and hollow pistons 15 are reciprocatively mounted within said cylinders 14, which pistons 15 are secured to the heads 16 which screw on the ends of the cylinders 9. The spokes of the wheel may be attached to the heads 16.

A collar 17 surrounds the intermediate portion of the hub 1 and is keyed to the hub member 3 at the inner end of the hub member 2. The collar 17 has a polygonal flange 18 which extends around the axis of the hub in a number of directions corresponding to the number of cylinders 14 and that portion of each direction of the flange extends at right angles to the axis of one of the cylinders 14. Notches 19 are provided in the inner ends of the walls of the cylinders 9 to receive the flange 18 to permit the proper relative movement of the hub and frame 7.

Cams 20 are provided on the inner ends of the cylinders 14 which are adapted to engage the collar 17 on the hub 1 to effect the outward movement of said cylinders and to limit the inward movement thereof as the wheel travels over irregular surfaces. Pins 21 are provided on the inner ends of the cylinders 14 which are adapted to engage the respective portions of the flange 18 adjacent thereto, to effect the inward movement of the cylinders 14 and to limit the outward movement thereof.

Heads 25 are screwed into the inner ends of the pistons 15 and are provided with central ports 26 which establish communication between the interior of the cylinders 14 and said pistons. Said ports may be regulated by needle valves 27, which extend out through the heads 16 and are threaded at 28 to engage the threaded opening in the head through which the valves extend. The heads 25 are also provided with ports 30 around the ports 26, which ports 30 lead from the interior of the cylinders 14 to the interior of the pistons 15 and are controlled by a weighted and spring-pressed centrifugal valve 35, located within the hollow piston 15, as will be described.

The valves 35 have a plurality of sleeves 36 thereon, which sleeves are provided with apertures 37 and are adapted normally to fit in the ports 30, in which position the apertures 37 rest in said ports and are closed, The outer ends of the sleeves are closed by rings 38 on the inner ends of the valves 35, which are adapted to rest against the interface of the heads 25 and close the outer ends of the ports 30 when the valve is in closed position and the apertures 37 are closed within the ports. The inner ends of the valves are adapted to engage the heads 25 and limit the inner closing movement of the valves.

The valves are provided with central bores 39 through which the stems of the needle valves 27 freely extend. Springs 40 are interposed between the outer ends of the valves 35 and the heads 16, surrounding the needle valve stems, which springs normally maintain the valves 35 in closed position, closing the ports 30. The piston heads 25 are also provided with small ports 45 surrounding the ports 26 between the ports 30, which ports lead from the interior of the cylinders 14 to the interior of the pistons 15. Packing rings 50 maintain liquid tight sliding joints between the cylinders 9 and 14, and packing rings 51 maintain liquid tight sliding joints between the cylinders 14 and pistons 15. The cylinders 14 and hollow pistons 15 are filled with a liquid such as oil.

The operation of the wheel is as follows:

When the wheel travels over an irregular road the vibration of the wheel and vehicle carried by the wheel causes relative movement of the hub 1 and frame 7 and relative reciprocating movement of the pistons 15 and cylinders 14, whereby shocks of the wheel in running over the irregularities are absorbed. When traveling at a low speed the port 26 is sufficiently large to allow sufficient liquid in the cylinders 14 to pass therethrough into the hollow pistons 15 as the pistons move inwardly and reduce the oil space in said cylinders and increase the oil spaces in the hollow pistons, and to allow sufficient liquid in the hollow pistons to pass therethrough into the cylinders as the pistons move outwardly and the oil spaces therein are decreased and the oil spaces in the cylinders are increased in order to give the wheel the desired resiliency between its hub and rim. But said ports are not large enough to allow the oil to pass from the cylinders into the hollow pistons and vice versa when the wheel travels at a high speed. When the wheel travels at a moderately high speed, the valve 35 moves outwardly by centrifugal force against the tension of the spring 40 and uncovers the ports 45 which permits a larger quantity and a more rapid flow of the liquid from the cylinders into the pistons and vice versa, through said ports to accommodate the new resilient conditions developed.

When the wheel travels at an extreme high speed the valves 35 move outwardly farther by centrifugal force and withdraw the sleeves 36 from the ports 30 until the apertures 37 rest beyond the outer face of the heads 25, thus allowing the oil to pass through the ports 30, sleeves 36 and apertures 37 from the cylinders into the pistons and vice versa to accommodate the new resilient conditions developed.

When the wheel slows down the valves 35 are moved inwardly by the springs 40 so that the apertures 37 first enter and close ports 30 and then the rings 38 engage the heads 25 and close the ports 45, thus reestablishing the normal low running resilient conditions of the wheel.

Having described my invention, I claim as new and desire to secure by Letters Patent:

1. In a hydraulic vehicle wheel, a hub, a frame surrounding said hub and mounted to move laterally with relation thereto, a plurality of cylinders on said frame, a plurality of hollow pistons fixed in said cylinders, a plurality of other cylinders reciprocatively mounted in said first cylinders, said pistons being reciprocatively mounted in said second cylinders, means on said hub for reciprocating said second cylinders as said hub and frame move with relation to each other, the heads of said pistons being provided with ports through which liquid may pass from said second cylinders into said hollow pistons or vice versa, as the pistons reciprocate in said second cylinders under slow running conditions of the wheel over irregularities, and means for allowing a greater amount of liquid to pass through the piston head when the speed of the wheel increases.

2. In a hydraulic vehicle wheel, a hub, a frame surrounding said hub and mounted to move laterally with relation thereto, a plurality of cylinders on said frame, a plurality of hollow pistons fixed in said cylinders, a plurality of other cylinders reciprocatively mounted in said first cylinders, said pistons being reciprocatively mounted in said second cylinders, means on said hub for reciprocating said second cylinders as said hub and frame move with relation to each other, the heads of said pistons being provided with ports through which liquid may pass from said second cylinders into said hollow pistons or vice versa as the pistons reciprocate in said second cylinders under slow running conditions of the wheel over irregularities, said piston heads being provided with other ports, valves for closing said ports when the wheel is running slowly, and means whereby said valves are opened automatically to allow a greater amount of liquid to pass through said other ports from the second cylinders into the hollow pistons or vice versa, as the speed of the wheel is increased, and means for automatically closing said valves and ports when the speed of the wheel decreases from its higher speed.

3. In a hydraulic vehicle wheel, a hub, a frame surrounding said hub and mounted to move laterally with relation thereto, a plurality of cylinders on said frame, a plurality of hollow pistons fixed in said cylinders, a plurality of other cylinders reciprocatively mounted in said first cylinders, said pistons being reciprocatively mounted in said second cylinders, means on said hub for reciprocating said second cylinders as said hub and frame move with relation to each other, the heads of said pistons being provided with ports through which liquid may pass from said second cylinders into said hollow pistons, or vice versa as the pistons reciprocate in said second cylinders under slow running conditions of the wheel over irregularities, said piston heads being provided with other ports, a valve for closing said ports when the wheel is running slowly, said valves being so mounted as to open automatically under the influence of centrifugal force to allow a greater amount of liquid to pass through said other ports from the second cylinders into the hollow pistons, or vice versa as the speed of the wheel is increased, and means for automatically closing said valves when the speed of the wheel decreases from its higher speed.

4. In a hydraulic vehicle wheel, a hub, a frame surrounding said hub and mounted to move laterally with relation thereto, a plurality of cylinders on said frame, a plurality of hollow pistons fixed in said cylinders, a plurality of other cylinders reciprocatively mounted in said second cylinders, means on said hub for reciprocating said second cylinders as said hub and frame move with relation to each other, the heads of said pistons being provided with ports through which liquid may pass from said second cylinders into said hollow pistons, or vice versa as the pistons reciprocate in said second cylinders under slow running conditions of the wheel over irregularities, said piston heads being provided with other ports, valves for closing said ports when the wheel is running slowly, means whereby said valves are opened automatically to allow a greater amount of liquid to pass through said other ports from the second cylinders into the hollow pistons, or vice versa as the speed of the wheel is increased, and springs for automatically closing said valves when the speed of the wheel decreases from its higher speed.

5. In a hydraulic vehicle wheel, a hub, a frame surrounding said hub and mounted to move laterally with relation thereto, a plurality of cylinders on said frame, a plurality of hollow pistons fixed in said cylinders, a plurality of other cylinders reciprocatively mounted in said first cylinders, said pistons being reciprocatively mounted in said second cylinders, means on said hub for reciprocating said second cylinders as said hub and frame move with relation to each other, the heads of said pistons being provided with ports through which liquid may pass from said second cylinders into said hollow pistons or vice versa as the pistons reciprocate in said second cylinders under slow running conditions of the wheel over irregularities, said piston heads being provided with other ports, a valve for closing said ports when the wheel is running slowly, said valves being so mounted as to open automatically under the influence of centrifugal force to allow a greater amount of liquid to pass through said other ports from the second cylinders into the hollow pistons or vice versa as the speed of the wheel is increased, and springs for automatically closing said valves when the speed of the wheel decreases from its higher speed.

6. In a hydraulic vehicle wheel, a hub, a frame surrounding said hub and mounted to move laterally with relation thereto, a plurality of cylinders on said frame, a plurality of hollow pistons fixed in said cylinders, a plurality of other cylinders reciprocatively mounted in said first cylinders, said pistons being reciprocatively mounted in said second cylinders, means on said hub for reciprocating said second cylinders as said hub and frame move with relation to each other, the heads of said pistons being provided with ports through which liquid may pass from said second cylinders into said hollow pistons or vice versa as the pistons reciprocate in said second cylinders under slow running conditions of the wheel over irregularities, said piston heads being provided with second ports and third ports, a valve for closing said second and third ports when the wheel is running slowly, means whereby said valves are opened automatically to open said second and third ports successively to allow a greater amount of oil to pass successively through said second and third ports from said second cylinders into said hollow pistons and vice versa when the speed of the wheel is successively increased to a moderately high speed and to an extreme high speed and means for automatically closing said valves and ports when the speed of the wheel decreases from its highest and higher speed to its lower speed.

7. In a hydraulic vehicle wheel, a hub, a frame surrounding said hub and mounted to move laterally with relation thereto, a plurality of cylinders reciprocatively mounted on said frame, a plurality of hollow pistons fixed on said frame and adapted to reciprocate in said cylinders, means on said hub for reciprocating said cylinders, as the hub and frame move with relation to each other, resilient means on the wheel for absorbing shocks, as the wheel runs slowly over irregularities, said cylinders and pistons being filled with liquid, and means for allowing a sufficient amount of liquid to pass from the cylinders into the piston and vice versa to absorb the shocks of the wheel while passing over irregularities at a higher rate of speed.

8. In a hydraulic vehicle wheel, a hub, a frame surrounding said hub and mounted to move laterally with relation thereto, a plurality of cylinders reciprocatively mounted on said frame, a plurality of hollow pistons fixed on said frame and adapted to reciprocate in said cylinders, means on said hub for reciprocating said cylinders as the hub and frame move with relation to each other, resilient means on the wheel for absorbing shocks as the wheel runs slowly over irregularities, said cylinders and pistons being filled with liquid, said piston heads being provided with ports, valves for closing said ports when the wheel is running slowly, and means whereby said valves are opened to allow a sufficient amount of liquid to pass through said ports from the cylinders into the pistons and vice versa to absorb the shocks as the wheel passes over irregularities at a higher rate of speed.

9. In a hydraulic vehicle wheel, a hub, a frame surrounding said hub and mounted to move laterally with relation thereto, a plurality of cylinders reciprocatively mounted on said frame, a plurality of hollow pistons fixed on said frame and adapted to reciprocate in said cylinders, means on said hub for reciprocating said cylinders as the hub and frame move with relation to each other, resilient means on the wheel for absorbing shocks as the wheel runs slowly over irregularities, said cylinders and pistons being filled with liquid, said piston heads being provided with ports, valves for closing said ports when the wheel is running slowly, said valves being so mounted as to open under the influence of centrifugal force to allow a sufficient amount of liquid to pass through said ports from the cylinders into the pistons and vice versa, to absorb the shocks as the wheel passes over irregularities at a higher rate of speed, and means for closing said valves and ports when the speed of the wheel is decreased from its higher speed.

10. In a hydraulic vehicle wheel, a hub, a frame surrounding said hub and mounted to move laterally with relation thereto, a plurality of cylinders reciprocatively mounted on said frame, a plurality of hollow pistons fixed on said frame and adapted to reciprocate in said cylinders, means on said hub for reciprocating said cylinders as the hub and frame move with relation to each other, resilient means on the wheel for absorbing shocks as the wheel runs slowly over irregularities, said cylinders and pistons being filled with liquid, said piston heads being provided with ports, valves for closing said ports when the wheel is running slowly, said valves being so mounted as to open under the influence of centrifugal force to allow a sufficient amount of liquid to pass through said ports from the cylinders into the pistons and vice versa, to absorb the shocks as the wheel passes over irregularities at a higher rate of speed, and springs for automatically closing said valves when the speed of the wheel decreases from its higher speed.

11. In a hydraulic vehicle wheel, a hub, a frame surrounding said hub and mounted to move laterally with relation thereto, a plurality of cylinders reciprocatively mounted on said frame, a plurality of hollow pistons fixed on said frame and adapted to reciprocate in said cylinders, means on said hub for reciprocating said cylinders as the hub and frame move with relation to each other, resilient means on the wheel for absorbing shocks as the wheel runs slowly over irregularities, said cylinders and pistons being filled with liquid, and means for allowing a sufficient amount of liquid to pass from the cylinders into the piston and vice versa to absorb the shocks of the wheel while passing over irregularities at a higher rate of speed, said piston heads being provided with ports, a valve, sleeves on said valves, closed at one end and provided with apertures, said sleeves being adapted to fit in said ports to close said apertures when the wheel runs slowly or at a higher rate of speed, and said valves being adapted to open automatically to withdraw said sleeves from the ports and uncover said apertures to permit a sufficient amount of liquid to pass through said ports, sleeves and apertures, from the cylinders to the pistons, or vice versa, to absorb shocks when the wheel travels over irregularities at a still higher rate of speed.

12. In a hydraulic vehicle wheel, a hub, a frame surrounding said hub and mounted to move laterally with relation thereto, a plurality of cylinders reciprocatively mounted on said frame, a plurality of hollow pistons fixed on said frame and adapted to reciprocate in said cylinders, means on said hub for reciprocating said cylinders as the hub and frame move with relation to each other, resilient means on the wheel for absorbing shocks as the wheel runs slowly over irregularities, said cylinders and pistons being filled with liquid, said piston heads being provided with ports, valves for closing said ports when the wheel runs slowly, means whereby said valves are automatically opened to allow a sufficient amount of liquid to pass from the cylinders into the pistons and vice versa to absorb the shocks while the wheel travels over irregularities at a higher rate of speed, said pistons being provided with other ports, sleeves on said valves closed at one end and provided with apertures, said sleeves being adapted to fit in said other ports to close said apertures when the wheel runs slowly and at said higher rate of speed, and said valves being adapted to withdraw said sleeves to allow a sufficient amount of liquid to pass through said other ports, sleeves and apertures from the cylinders to the pistons, or vice versa, to absorb the shocks when the wheel travels over irregularities at a still higher rate of speed.

13. In a hydraulic vehicle wheel, a hub, a frame surrounding said hub and mounted to move laterally with relation thereto, a plurality of cylinders reciprocatively mounted on said frame, a plurality of hollow pistons fixed on said frame and adapted to reciprocate in said cylinders, means on said hub for reciprocating said cylinders as the hub and frame move with relation to each other, said piston heads being provided with ports through which liquid may pass from the cylinders into the pistons and vice versa to absorb the shocks as the wheel travels slowly over irregularities, adjusting valves for said ports, said piston heads being provided with second ports surrounding said first ports, valves surrounding said adjusting valves for closing said second ports when the wheel runs slowly, means whereby said valves are automatically opened to allow a sufficient amount of liquid to pass from the cylinders into the pistons, or vice versa, when the wheel travels over irregularities at a higher speed, said piston heads being provided with third ports, surrounding said first ports, sleeves on said valves closed at one end and provided with apertures, said sleeves being adapted to fit in said other ports to close said apertures when the wheel runs slowly and at said higher rate of speed, and said valves being adapted to withdraw said sleeves to allow a sufficient amount of liquid to pass through said other ports, sleeves and apertures from the cylinders to the pistons or vice versa to absorb the shocks when the wheel travels over irregularities at a still higher rate of speed.

14. In a hydraulic vehicle wheel, a hub, a frame surrounding said hub and mounted to move laterally with relation thereto, a plurality of cylinders reciprocatively mounted on said frame, a plurality of hollow pistons fixed on said frame and mounted to reciprocate in said cylinders as the hub and frame move with relation to each other, a collar secured to said hub, a flange on said collar, cams on the ends of said pistons for engaging said collar whereby the cylinders are moved outwardly and their inward movement limited, and pins on said cams for engaging said flange whereby said cylinders are moved inwardly and their outward movement limited, as the wheel travels over irregularities, said pistons and cylinders being constructed and arranged to absorb shocks as the wheel travels over irregularities.

15. In a hydraulic vehicle wheel, a hub, a frame surrounding said hub and mounted to move laterally with relation thereto, a plurality of cylinders reciprocatively mounted on said frame, a plurality of hollow pistons fixed on said frame and mounted to reciprocate in said cylinders as the hub and frame move with relation to each other, a collar secured to said hub, a flange on said collar, having surfaces extending transversely with relation to the axis of the respective cylinders, cams on the ends of said pistons for engaging said collar whereby the cylinders are moved outwardly and their inward movement limited, and pins on said cams for engaging said flange whereby said cylinders are moved inwardly and their outward movement limited, as the wheel travels over irregularities, said pistons and cylinders being constructed and arranged to absorb shocks as the wheel travels over irregularities.

In testimony whereof I affix my signature.

HORACE HOUGHTON TAYLOR.

Copies of this patent may be obtained for five cents each, by addressing the "Commissioner of Patents, Washington, D. C."